US009160874B2

(12) United States Patent
Hozono

(10) Patent No.: US 9,160,874 B2

(45) Date of Patent: Oct. 13, 2015

(54) IMAGE FORMING APPARATUS

(71) Applicant: KYOCERA Document Solutions Inc., Osaka (JP)

(72) Inventor: Tomohide Hozono, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/627,317

(22) Filed: Feb. 20, 2015

(65) Prior Publication Data

US 2015/0244887 A1 Aug. 27, 2015

(30) Foreign Application Priority Data

Feb. 27, 2014 (JP) ................................ 2014-037486

(51) Int. Cl.
*G03G 15/00* (2006.01)
*H04N 1/00* (2006.01)

(52) U.S. Cl.
CPC ................................ *H04N 1/00559* (2013.01)

(58) Field of Classification Search
CPC ................................................ H04N 1/00559
USPC ........................................... 399/377, 379, 81
See application file for complete search history.

(56) References Cited

U.S. PATENT DOCUMENTS

| | | | | |
|---|---|---|---|---|
| 6,725,001 | B2 * | 4/2004 | Takahashi et al. | 399/81 |
| 8,339,688 | B2 * | 12/2012 | Nakahara | |
| 8,934,802 | B2 * | 1/2015 | Koyanagi et al. | 399/81 |
| 2007/0147869 | A1 * | 6/2007 | Akiyama et al. | 399/81 |
| 2013/0242357 | A1 * | 9/2013 | Takahashi | |

FOREIGN PATENT DOCUMENTS

| | | | |
|---|---|---|---|
| JP | 2007163812 A | * | 6/2007 |
| JP | 2013-083787 | | 5/2013 |

* cited by examiner

*Primary Examiner* — Susan Lee

(74) *Attorney, Agent, or Firm* — Wenderoth, Lind & Ponack, L.L.P.

(57) ABSTRACT

A housing includes a first frame which includes a first accommodating portion having a bottom plate to be supported on a predetermined support surface, the first accommodating portion having an accommodating space for accommodating the image reading part, and a second accommodating portion protruding outward in a first direction from a side surface of the first accommodating portion, the second accommodating portion positioned higher than the bottom plate, the second accommodating portion having an accommodating space for accommodating the operation unit; a second frame attached to a peripheral edge portion of an opening formed on a top surface of the first accommodating portion; and an engaging mechanism installed at the side of a base end portion of the second accommodating portion and configured to bring the second accommodating portion and the second frame into engagement in a direction perpendicular to the side surface of the first accommodating portion.

7 Claims, 12 Drawing Sheets

IMAGE FORMING APPARATUS

CROSS-REFERENCE TO RELATED APPLICATION

This application is based upon and claims the benefit of priority from Japanese Patent Application No. 2014-037486 filed on Feb. 27, 2014, the entire contents of which are incorporated herein by reference.

BACKGROUND

In an image forming apparatus provided with an image reading part capable of reading an image of a manuscript, it is sometimes the case that an operation unit capable of inputting an operation with respect to the image forming apparatus is disposed so as to protrude from a side portion of the image reading part. In the image forming apparatus of this kind, the image reading part and the operation unit are often installed within one housing in order to reduce the component cost and the assembly cost.

SUMMARY

An image forming apparatus according to one aspect of the present disclosure includes an image reading part, an operation unit and a housing. The image reading part is configured to read an image of a manuscript placed on a manuscript placing surface. The operation unit is configured to receive an input operation. The housing is configured to accommodate the image reading part and the operation unit. The housing includes a first frame, a second frame and an engaging mechanism. The first frame includes a first accommodating portion and a second accommodating portion. The first accommodating portion has a bottom plate to be supported on a predetermined support surface. The first accommodating portion has an accommodating space for accommodating the image reading part. The second accommodating portion protrudes outward in a first direction from a side surface of the first accommodating portion. The second accommodating portion is positioned higher than the bottom plate. The second accommodating portion has an accommodating space for accommodating the operation unit. The second frame is attached to a peripheral edge portion of an opening formed on a top surface of the first accommodating portion. The engaging mechanism is installed at the side of a base end portion of the second accommodating portion and is configured to bring the second accommodating portion and the second frame into engagement with each other in a direction perpendicular to the side surface of the first accommodating portion.

DETAILED DESCRIPTION

An embodiment of the present disclosure will now be described with reference to the accompanying drawings. The embodiment to be described below is one example which embodies the technology of the present disclosure and is not intended to limit the technical scope of the present disclosure.

[Schematic Configuration of Image Forming Apparatus 10]

Figure 1:
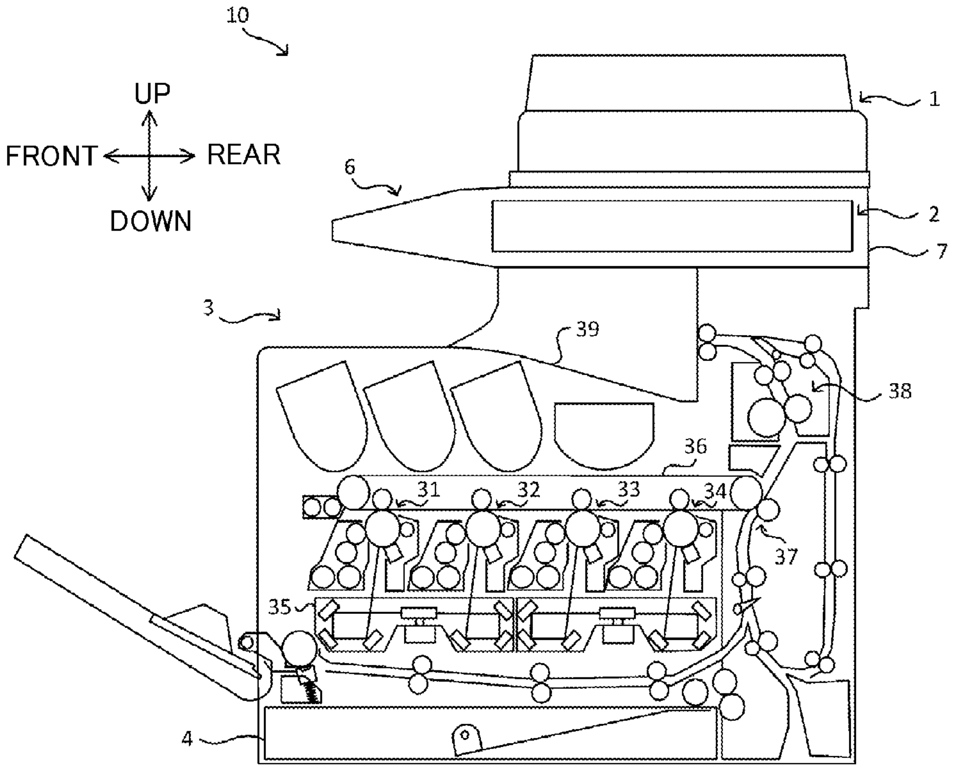
FIG. 1 is a view showing a configuration of an image forming apparatus according to the present embodiment.
Figure 2:
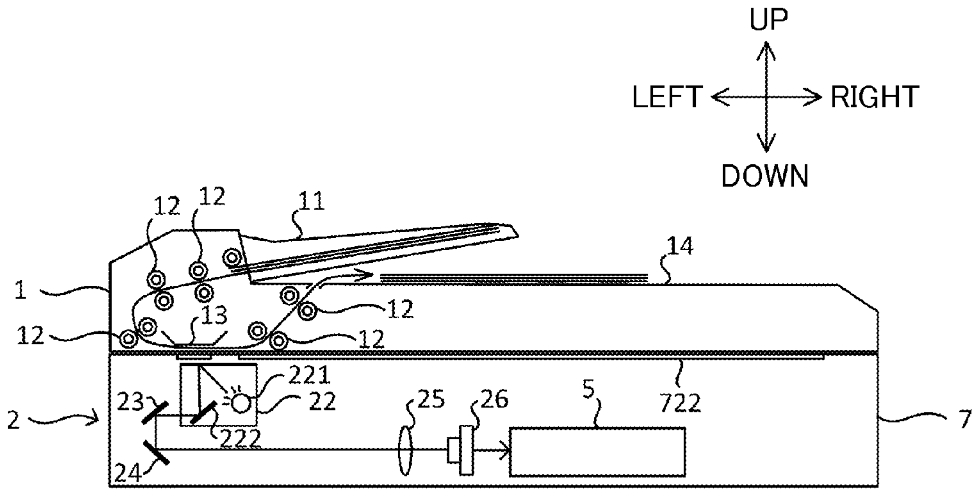
FIG. 2 is a view showing a configuration of an image reading part of the image forming apparatus according to the present embodiment.
Figure 3:
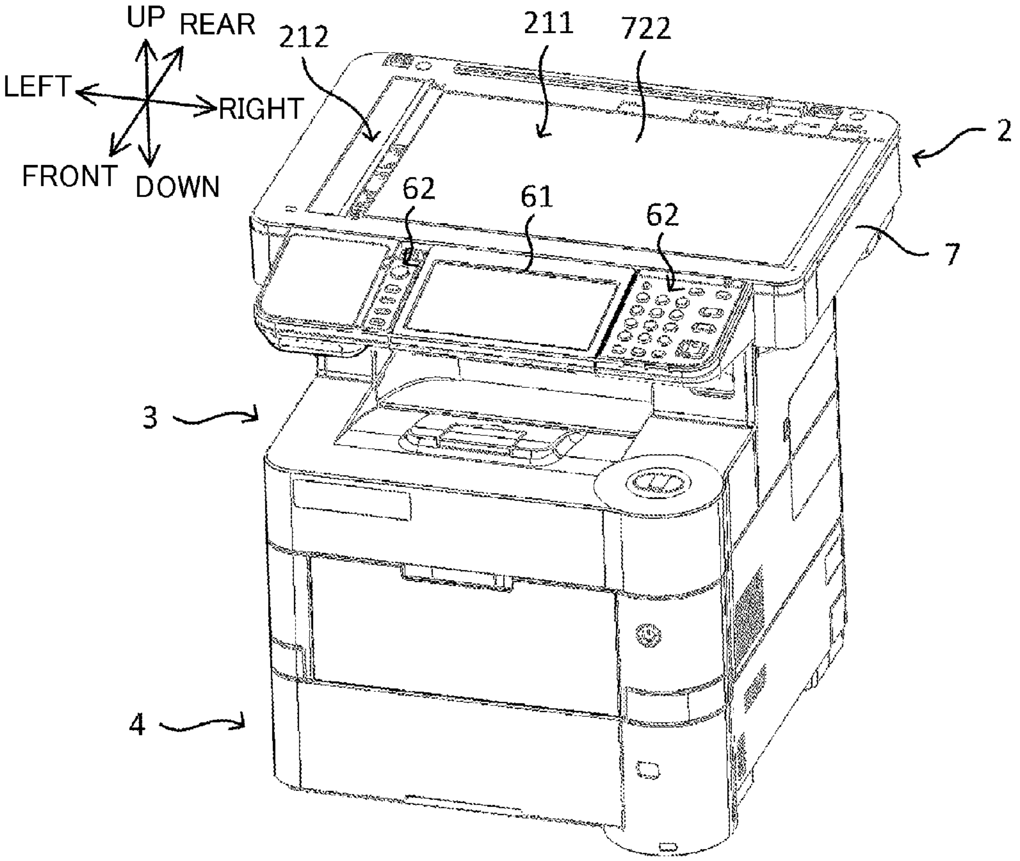
FIG. 3 is a view showing an outward appearance of the image forming apparatus according to the present embodiment.
Figure 4:
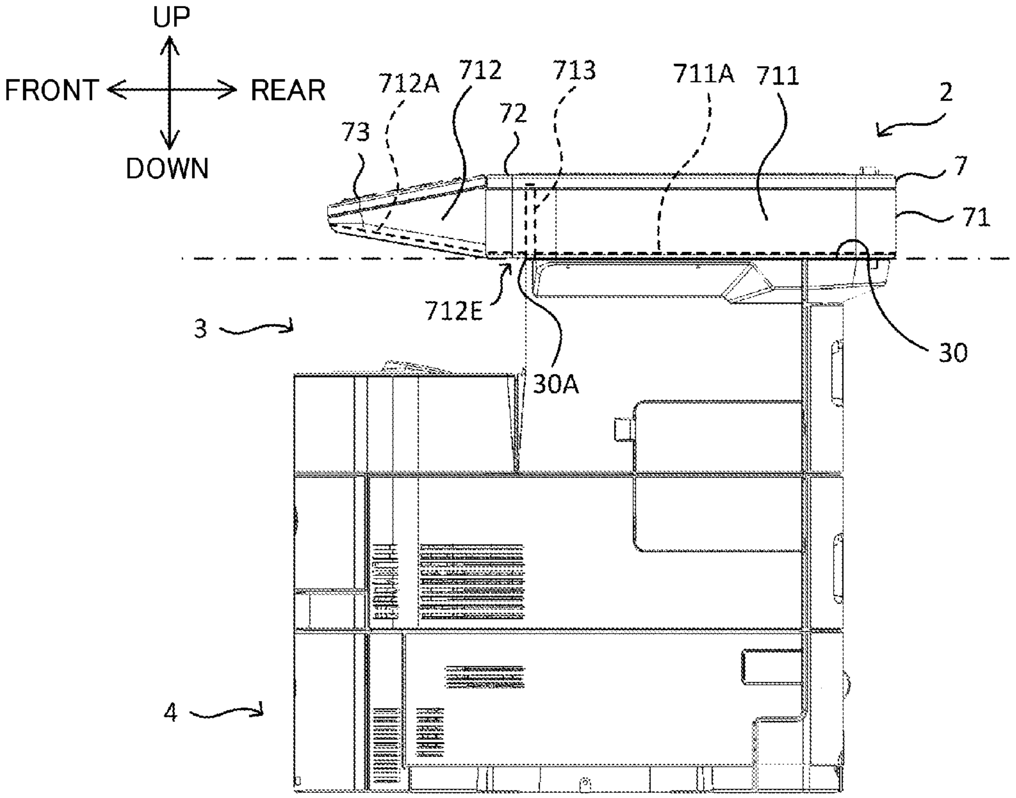
FIG. 4 is a view showing the outward appearance of the image forming apparatus according to the present embodiment.

First, a schematic configuration of an image forming apparatus 10 according to the present embodiment will be described with reference to FIGS. 1 to 4. FIG. 1 is a schematic sectional view showing the schematic configuration of the image forming apparatus 10. FIG. 2 is a schematic sectional view showing configurations of an ADF 1 and an image reading part 2. FIG. 3 is a perspective view showing an outward appearance of the image forming apparatus 10. FIG. 4 is a side view showing the outward appearance of the image forming apparatus 10. In FIGS. 3 and 4, there is shown a state in which the ADF 1 is removed from the image forming apparatus 10.

As shown in FIGS. 1 and 2, the image forming apparatus 10 includes an ADF 1, an image reading part 2, an image forming part 3, a sheet feeding part 4, a control part 5, an operation display part 6 and a housing 7. The image forming apparatus 10 is a multifunction peripheral having a plurality of functions such as a scan function of reading image data from a manuscript, a printer function, a facsimile function, a copy function and the like. In the image forming apparatus 10, the configuration including the image reading part 2, the operation display part 6 and the housing 7 is one example. The technology of the present disclosure is applicable to an image forming apparatus such as a scanner, a facsimile machine, a copier or the like.

More specifically, as shown in FIG. 1, the image forming part 3 includes a plurality of image forming units 31 to 34, an exposure device (LSU) 35, an intermediate transfer belt 36, a secondary transfer roller 37, a fixing device 38 and a sheet discharge tray 39. These component elements are installed in a chassis (not shown) which constitutes a frame of the image forming part 3. The image forming units 31 to 34 are electro-photography-type image forming units. The image forming unit 31 corresponds to C (cyan), the image forming unit 32 corresponds to M (magenta), the image forming unit 33 corresponds to Y (yellow), and the image forming unit 34 corresponds to K (black). Each of the image forming units 31 to 34 includes a photosensitive drum, a charging device, a developing device, a primary transfer roller, a cleaning device, and so forth. The exposure device 35 irradiates laser light on the respective photosensitive drums based on image data, thereby forming electrostatic latent images on the respective photosensitive drums based on the image data. Toner images of respective colors developed on the respective photosensitive drums by the developing devices are intermediately transferred to the intermediate transfer belt 36 and are then transferred by the secondary transfer roller 37 to a paper sheet supplied from the sheet feeding part 4. Thereafter, an image is formed on the paper sheet to which the toner images are transferred, by melting and fixing the toner images with the fixing device 38. The paper sheet is discharged to the sheet discharge tray 39.

The control part 5 includes control equipment such as a CPU, a ROM, a RAM, an EEPROM and the like, which are not shown in the drawings.

Referring to FIG. 2, the ADF 1 is an automatic manuscript conveying device which includes a manuscript setting unit 11, a plurality of conveying rollers 12, a manuscript presser 13 and a sheet discharge unit 14. In the ADF 1, as the respective conveying rollers 12 are driven by motors not shown, the manuscript placed on the manuscript setting unit 11 is conveyed to the sheet discharge unit 14 via a position where the image data are read by the image reading part 2. Thus, the image reading part 2 can read the image data from the manuscript conveyed by the ADF 1.

The image reading part 2 is configured to read the image data from the manuscript. More specifically, as shown in FIG. 2, the image reading part 2 includes a reader unit 22, mirrors 23 and 24, an optical lens 25 and a CCD (Charge Coupled Device) 26. These component elements and the component elements making up the operation display part 6 are installed within the housing 7 which constitutes a chassis of the image reading part 2 and the operation display part 6.

The image reading part 2 is mounted on the top portion of the image forming part 3. A flat support surface 30 for supporting the image reading part 2 is formed on the top portion of the image forming part 3. The bottom portion of the housing 7 is supported on the support surface 30. In this regard, the boundary between the support surface 30 and the bottom portion of the housing 7 is indicated by a single-dot chain line in FIG. 4. In other words, when the image reading part 2 and the image forming part 3 are divided by a single-dot chain line in FIG. 4, the top surface of the image forming part 3 becomes the support surface 30. The configuration of the housing 7 will be described later.

As shown in FIG. 3, a light-transmitting contact glass 722 is installed on the top surface of the image reading part 2. A manuscript placing surface 211 and a conveying reading surface 212 are defined on the top surface of the contact glass 722. That is to say, the manuscript placing surface 211 and the conveying reading surface 212 are configured by the contact glass 722. In this regard, the manuscript placing surface 211 is a region in which the manuscript as an image data reading target is placed. On the manuscript placing surface 211, manuscripts having different sizes can be placed in alignment with a predetermined placing reference position. The conveying reading surface 212 is a region in which the light irradiated from the reader unit 22 is transmitted toward the manuscript conveyed by the ADF 1.

The reader unit 22 includes a light source 221 and a mirror 222. The reader unit 22 is configured such that it can be moved in a sub-scanning direction (the left-right direction in FIG. 2) by a moving mechanism (not shown) which makes use of a drive means such as a stepping motor or the like. If the reader unit 22 is moved in the sub-scanning direction by the drive means, the light irradiated from the light source 221 toward the contact glass 722 is scanned in the sub-scanning direction.

The light source 221 includes a plurality of white LEDs disposed along a main scanning direction (the front-rear direction in FIG. 1). The light source 221 irradiates white light corresponding to one line in the main scanning direction on the manuscript through the manuscript placing surface 211 or the conveying reading surface 212. The irradiation position of the light irradiated by the light source 221 is the reading position of the image data read by the image reading part 2. The reading position is moved in the sub-scanning direction along with the movement of the reader unit 22 in the sub-scanning direction. More specifically, when the image data are read from the manuscript placed on the manuscript placing surface 211, the reader unit 22 is moved to a position where the light of the light source 221 passes through the manuscript placing surface 211. When the image data are read from the manuscript conveyed by the ADF 1, the reader unit 22 is moved to a position where the light of the light source 221 passes through the conveying reading surface 212.

The mirror 222 reflects the light, which is irradiated from the light source 221 and reflected by the surface of the manuscript existing in the reading position, toward the mirror 23. The light reflected by the mirror 222 is guided to the optical lens 25 by the mirrors 23 and 24. The optical lens 25 collects the light incident from the mirror 24 and causes the collected light to be incident on the CCD 26.

The CCD 26 is an image sensor which includes a photoelectric conversion element for converting the received light to an electric signal (or a voltage) corresponding to the quantity of the light and outputting the electric signal as the image data. When the light is irradiated from the light source 221, the CCD 26 inputs the electric signal, which is based on the reflected light reflected from the manuscript and incident on the CCD 26, to the control part 5 as the image data of the manuscript.

As shown in FIG. 3, the operation display part 6 includes a display unit 61 and an operation unit 62. The display unit 61 is a display device, such as a liquid crystal display or the like, which displays different kinds of information pursuant to a control instruction sent from the control part 5. The operation unit 62 includes a plurality of hard keys for inputting different kinds of information to the control part 5 in response to a user's operation. For example, the hard keys include a function selection button, a start button, a reset button, ten keys, and so forth. The display unit 61 may be configured by a touch panel capable of inputting an operation and may serve as the operation unit 62.

In an image forming apparatus such the image forming apparatus or the like, it is sometimes the case that an operation unit capable of inputting an operation with respect to the image forming apparatus is disposed so as to protrude from a side portion of an image reading part. In the image forming apparatus of this kind, the image reading part and the operation unit are often installed within one housing in order to reduce the component cost and the assembly cost.

However, if the image reading part and the operation unit protruding from the side portion of the image reading part are installed within one housing, the operation unit accommodating portion of the housing is pushed down when a user performs an operation, thereby impairing an operation feeling. This is because the operation unit accommodating portion of the housing is installed in a protruding state. Particularly, if a resin is selected as a material of the housing, the stiffness of the operation unit accommodating portion of the housing is insufficient. Thus, the operation unit accommodating portion of the housing is easily bent downward during the operation and the deterioration of an operation feeling is conspicuous. In contrast, in the image forming apparatus 10, the housing 7 for accommodating the image reading part 2 and the operation display part 6 is provided with engaging mechanisms 74 (engaging mechanisms 74A, 74B and 74C). This makes it possible to suppress the push-down of the portion of the housing 7 which accommodates the operation display part 6.

Figure 5:
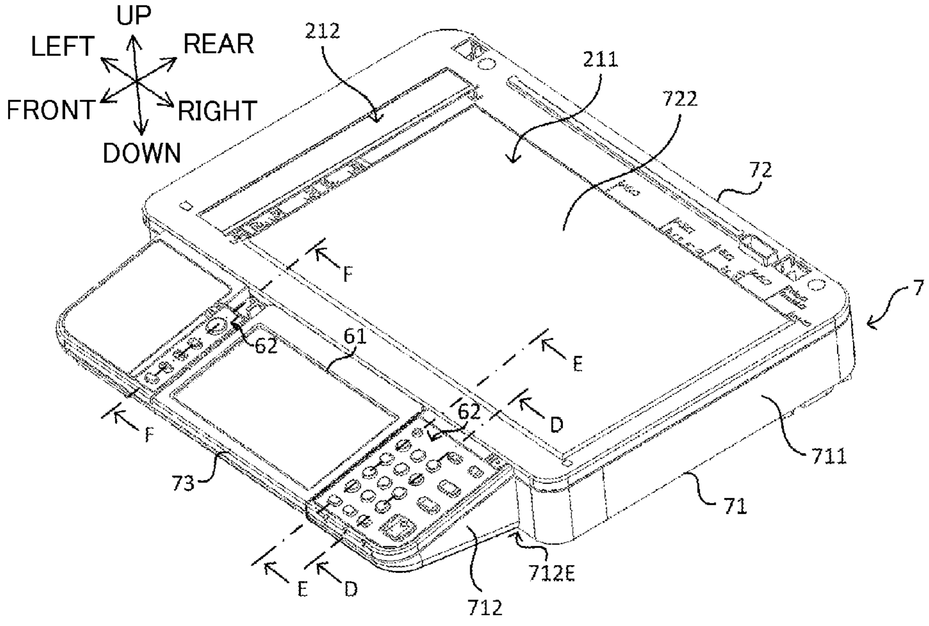
FIG. 5 is a view showing a housing of the image forming apparatus according to the present embodiment.
Figure 6:
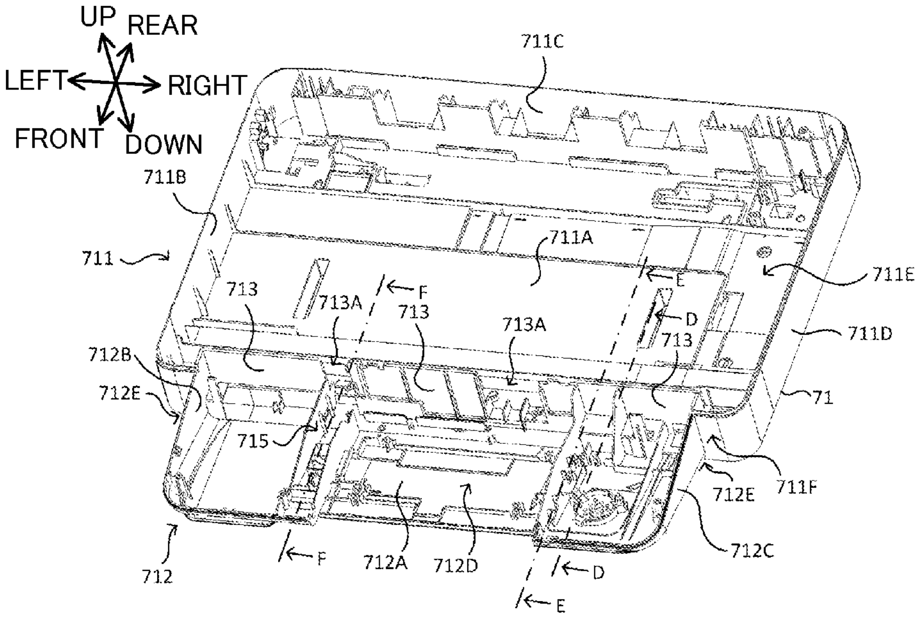
FIG. 6 is a view showing a first frame of the image forming apparatus according to the present embodiment.
Figure 7:
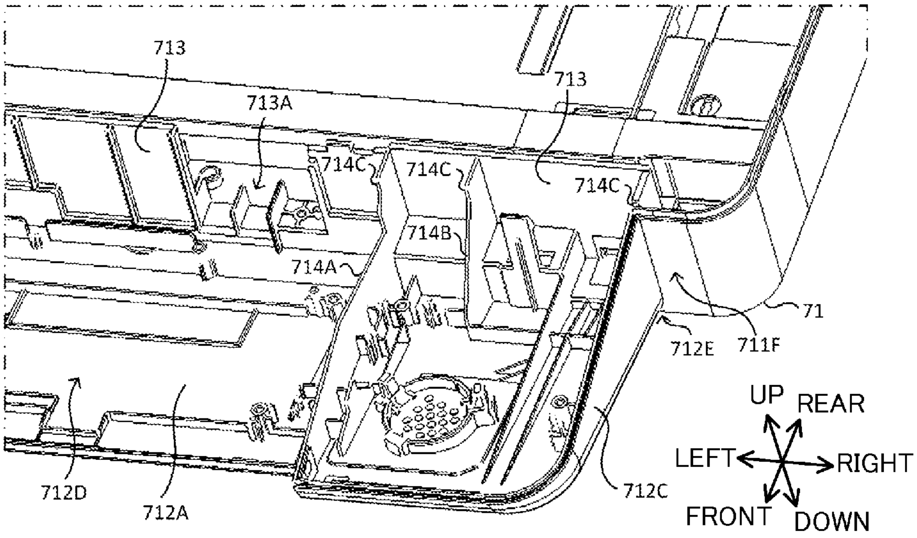
FIG. 7 is a view showing the first frame of the image forming apparatus according to the present embodiment.
Figure 8:
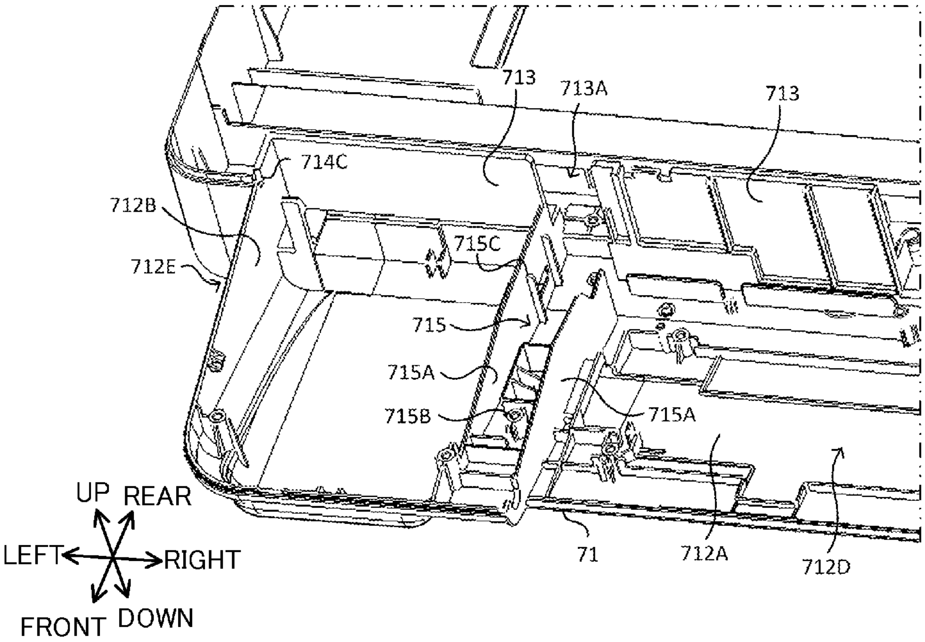
FIG. 8 is a view showing the first frame of the image forming apparatus according to the present embodiment.
Figure 9:
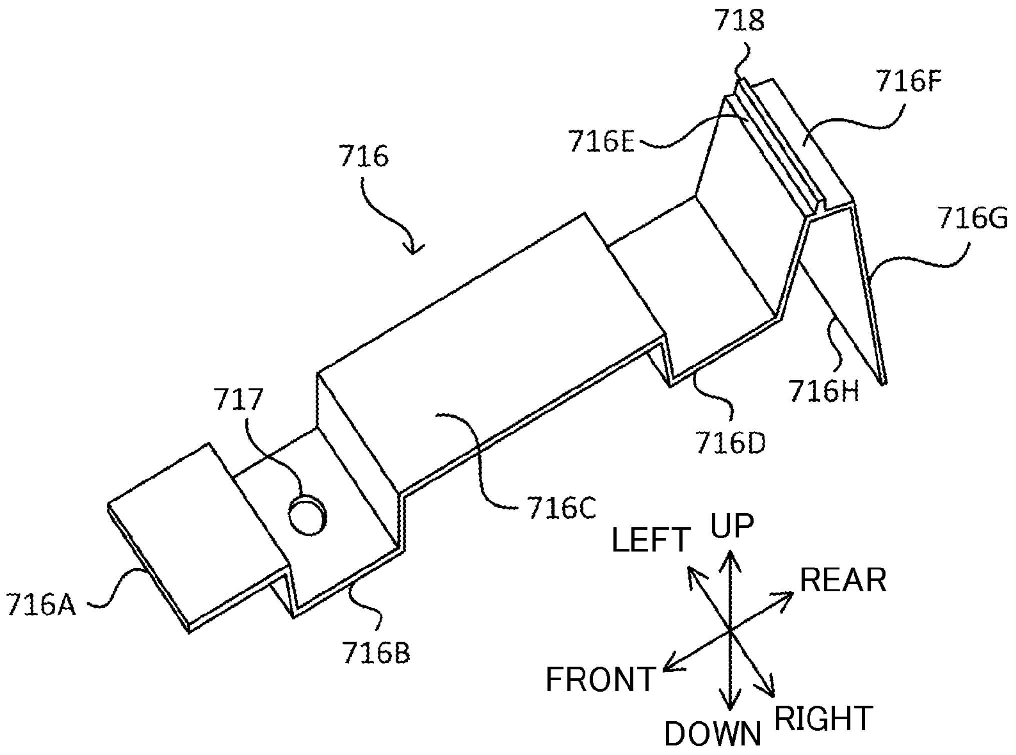
FIG. 9 is a view showing a second cover member of the image forming apparatus according to the present embodiment.
Figure 10A:
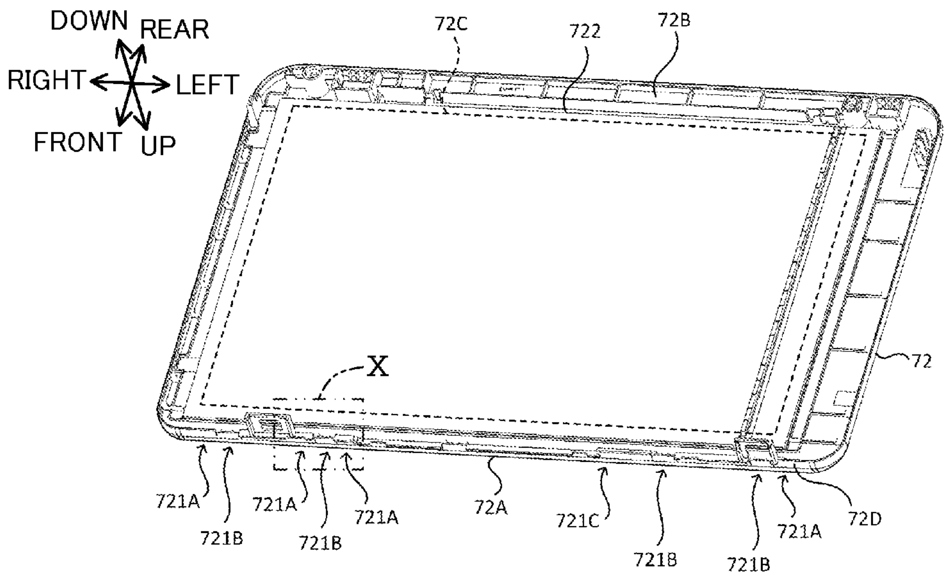
FIG. 10A is a view showing a second frame of the image forming apparatus according to the present embodiment.
Figure 10B:
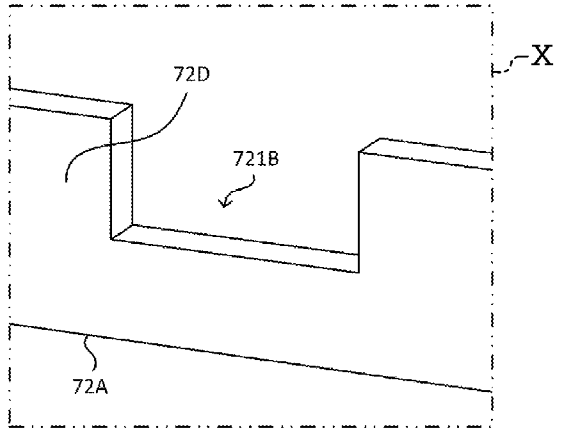
FIG. 10B is an enlarged view of a portion designated by X in FIG. 10A.
Figure 11A:
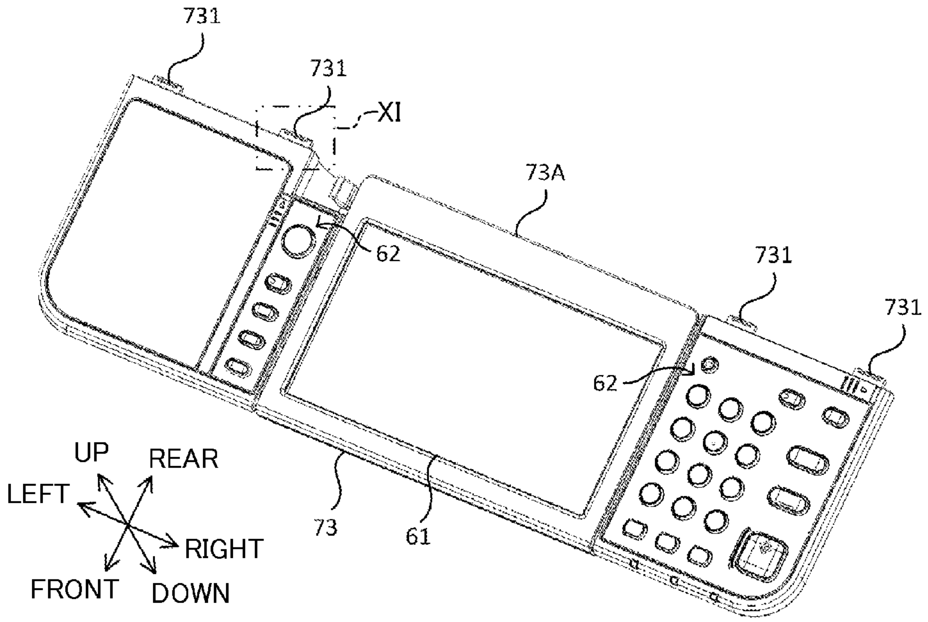
FIG. 11A is a view showing a first cover member of the image forming apparatus according to the present embodiment.
Figure 11B:
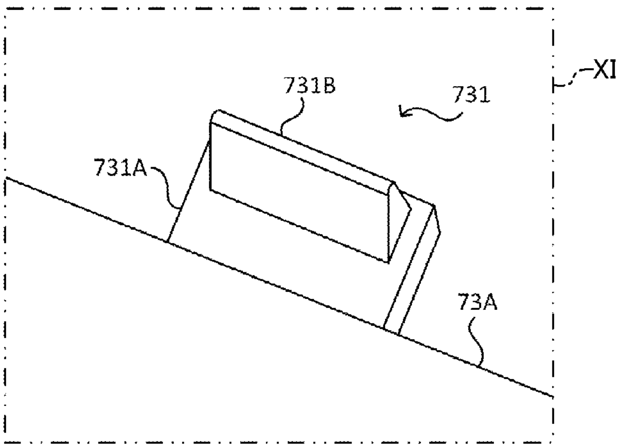
FIG. 11B is an enlarged view of a portion designated by XI in FIG. 11A.

Hereinafter, the housing 7 will be described with reference to FIGS. 1 to 11. In this regard, FIG. 5 is a perspective view of the housing 7. FIG. 6 is a perspective view of a first frame 71. FIG. 7 is an enlarged view of a right front portion of the first frame 71. FIG. 8 is an enlarged view of a left front portion of the first frame 71. FIG. 9 is a perspective view of a second cover member 716. FIG. 10A is a rear perspective view of a second frame 72. FIG. 10B is an enlarged view of a region surrounded by a double-dot chain line in FIG. 10A. FIG. 11A is a perspective view of a first cover member 73. FIG. 11B is an enlarged view of a region surrounded by a double-dot chain line in FIG. 11A.

AS shown in FIG. 5, the housing 7 is a chassis which is used in common for the image reading part 2 and the operation display part 6. That is to say, the component elements of the image reading part 2 and the operation display part 6 are accommodated within the housing 7. The housing 7 is attached to a chassis of the image forming part 3, whereby the housing 7 forms a portion of a chassis of the image forming apparatus 10. As shown in FIGS. 3 and 4, the housing 7 is supported on the support surface 30 existing in the top portion of the chassis of the image forming part 3. A portion of the housing 7 protrudes forward beyond a front end 30A of the support surface 30.

The housing 7 includes a first frame 71, a second frame 72, a first cover member 73 and engaging mechanisms 74 (engaging mechanisms 74A, 74B and 74C).

As shown in FIGS. 5 and 6, the first frame 71 is a member which constitutes the bottom portion and the side portion of the housing 7. The first frame 71 includes a first accommodating portion 711, a second accommodating portion 712, a partition wall 713, ribs 714 (ribs 714A and 714B), a wiring line laying portion 715 and a second cover member 716.

The first accommodating portion 711 includes an accommodating space in which the component elements of the image forming part 3 are accommodated. As shown in FIG. 6, the first accommodating portion 711 includes a rectangular flat bottom plate 711A elongated in the left-right direction. The bottom plate 711A is kept horizontal when the image forming apparatus 10 is installed in place. The first accommodating portion 711 further includes three sidewalls 711B, 711C and 711D erected from the left end portion, the rear end portion and the right end portion of the bottom plate 711A. The first accommodating portion 711 further includes the partition wall 713 erected from the vicinity of the front end portion of the bottom plate 711A. That is to say, the first accommodating portion 711 is formed into a substantially rectangular parallelepiped box shape in which the bottom plate 711A serves as a bottom surface and an opening 711E is opened upward. The first accommodating portion 711 and the second accommodating portion 712 to be described later are one-piece formed by a mold using a resin. The space surrounded by the bottom plate 711A, the three sidewalls 711B, 711C and 711D and the partition wall 713 is an accommodating space within which the component elements of the image forming part 3 are accommodated.

The partition wall 713 extends more upward than the sidewalls 711B, 711C and 711D. That is to say, the top end of the partition wall 713 is positioned higher than the top ends of the sidewalls 711B, 711C and 711D.

As shown in FIG. 6, the partition wall 713 does not continuously extend in the left-right direction. Cutouts 713A are formed at the left side and the right side of the left-right-direction center of the partition wall 713. That is to say, three partition walls 713 are formed in the first accommodating portion 711 by virtue of the cutouts 713A. Needless to say, the cutouts 713A may not be formed and the partition wall 713 may have a shape continuously extending in the left-right direction. As shown in FIG. 4, the partition wall 713 is not erected from the front edge of the bottom plate 711A but is erected upward from a position slightly spaced apart from the front edge of the bottom plate 711A. Description will be made later on the erection position of the partition wall 713.

In the present embodiment, the lower surface of the bottom plate 711A of the first accommodating portion 711, namely the bottom portion of the first accommodating portion 711, is supported on the support surface 30. As shown in FIG. 4, the front end of the bottom plate 711A protrudes more forward than the front end 30A of the support surface 30. The partition wall 713 is erected upward from a position corresponding to the portion of the bottom plate 711A just above the front end 30A of the support surface 30.

The second accommodating portion 712 includes an accommodating space in which the component elements of the operation display part 6 are accommodated. As shown in FIGS. 4 to 6, the second accommodating portion 712 protrudes outward (forward) (one example of a first direction) from the front surface 711F which is the front side surface of the first accommodating portion 711. As shown in FIG. 4, the second accommodating portion 712 is positioned more upward than the bottom plate 711A. More specifically, the second accommodating portion 712 includes a rectangular bottom plate 712A elongated in the left-right direction. The bottom plate 712A is formed into a flat plate shape continuously extending forward from the front end of the bottom plate 711A of the first accommodating portion 711. When the image forming apparatus 10 is installed in place, the bottom plate 712A is gently inclined forward and upward from the front end of the bottom plate 711A. Thus, the second accommodating portion 712 is positioned higher than the bottom plate 711A. Accordingly, the second accommodating portion 712 is not supported by the support surface 30. As shown in FIG. 4, the second accommodating portion 712 is supported in such a state that it protrudes in a hollow shape.

As shown in FIG. 6, the second accommodating portion 712 includes two sidewalls 712B and 712C elected from the left end portion and the right end portion of the bottom plate 712A. The sidewalls 712B and 712C are disposed so as to face each other in the left-right direction. The sidewalls 712B and 712C extend forward from the left-right-direction opposite end portions of the partition wall 713. The sidewalls 712B and 712C further extend forward beyond the front surface 711F. The extension-direction tip portions of the sidewalls 712B and 712C are formed into a taper shape. The top surface of the second accommodating portion 712 is opened. An opening 712D is formed on the top surface of the second accommodating portion 712. Since the second accommodating portion 712 is configured as above, an accommodating space surrounded by the bottom plate 712A, the two sidewalls 712B and 712C and the partition wall 713 is formed within the second accommodating portion 712. That is to say, the space surrounded by the bottom plate 712A, the two sidewalls 712B and 712C and the partition wall 713 is an accommodating space within which the component elements of the operation display part 6 are accommodated. As shown in FIG. 6, the second accommodating portion 712 protrudes forward from a position slightly spaced apart from the sidewalls 711B and 711D toward the left-right-direction center of the front surface 711F. Needless to say, the second accommodating portion 712 may be formed so as to protrude forward from the entire region of the front surface 711F.

As described above, the second accommodating portion 712 protrudes forward from the front surface 711F. Therefore, if the buttons existing on the operation surface of the operation display part 6 are pushed down, there may be a case where the second accommodating portion 712 is bent downward about a base end portion 712E which is a protrusion base end of the second accommodating portion 712. Particularly, in the second accommodating portion 712 whose protruding end is formed into a taper shape, if the hard keys disposed in the protruding end of the second accommodating portion 712 are pushed down, the second accommodating portion 712 tends to be bent downward. In order to suppress such bending, the engaging mechanisms 74 (the engaging mechanisms 74A, 74B and 74C) are installed in the housing 7.

As shown in FIG. 7, ribs 714A and 714B are installed in the second accommodating portion 712. In the following description, the ribs 714A and 714B are generically referred to as ribs 714. The respective ribs 714 extend forward from the partition wall 713 in the second accommodating portion 712. The ribs 714 are formed into a plate shape perpendicular to the partition wall 713 and the bottom plate 712A of the second accommodating portion 712. More specifically, the ribs 714A and 714B are installed in the named order from the left end portion of the partition wall 713 toward the right end portion thereof.

As shown in FIG. 7, the rib 714A extends from a position near the left end portion of the right partition wall 713 of the three partition walls 713 installed in the first frame 71 toward the front end portion of the second accommodating portion 712. The top end of the rib 714A is gently inclined downward toward the front end portion of the second accommodating portion 712. As shown in FIG. 7, the rib 714B obliquely extends from a position between the base end portion of the rib 714A in the partition wall 713 and the base end portion of the sidewall 712C positioned in the right end portion of the partition wall 713 toward the bottom plate 712A. Each of the rib 714A and the rib 714B extends from the bottom plate 712A to the top end portion of the partition wall 713 along the partition wall 713. That is to say, the top end of each of the rib 714A and the rib 714B is flush with the top end of the partition wall 713.

The sidewalls 712B and 712C of the second accommodating portion 712 make up the left-right-direction opposite side surfaces of the second accommodating portion 712. As mentioned above, the sidewalls 712B and 712C extend forward from the partition wall 713. As shown in FIGS. 7 and 8, the sidewalls 712B and 712C are formed into a plate shape perpendicular to the bottom plate 712A of the second accommodating portion 712. On this point, the sidewalls 712B and 712C are common to the ribs 714. That is to say, the sidewalls 712B and 712C are one example of ribs. Just like the ribs 714, the top end of each of the sidewalls 712B and 712C is flush with the top end of the partition wall 713.

The ribs 714A and 714B and the sidewalls 712B and 712C are respectively provided with protrusion portions 714C. The protrusion portions 714C are portions which horizontally extend from the top end portion of the partition wall 713 to the front surface 711F and extend downward along the front surface 711F. The protrusion portion 714C of the sidewall 712B is configured by a portion of the sidewall 712B. Specifically, the protrusion portion 714C of the sidewall 712B is an upper rear end portion of the sidewall 712B and is a region which exists between the front surface 711F and the partition wall 713. The protrusion portion 714C of the sidewall 712C is configured by a portion of the sidewall 712C. Specifically, the protrusion portion 714C of the sidewall 712C is an upper rear end portion of the sidewall 712C and is a region which exists between the front surface 711F and the partition wall 713.

The wiring line laying portion 715 is a partial region of the bottom plate 712A in which wiring lines are laid. The wiring lines extend through the left cutout 713A to interconnect the circuit substrate of the operation display part 6 and the control part 5 (see FIG. 2) disposed at the side of the first accommodating portion 711. More specifically, as shown in FIG. 8, the wiring line laying portion 715 is a region defined in the bottom plate 712A by two partition walls 715A erected parallel to the sidewall 712B in a corresponding relationship with the positions of the opposite end portions of the left cutout 713A The second cover member 716 (see FIG. 9) is a cover member which covers the wiring lines laid in the wiring line laying portion 715. More specifically, as shown in FIG. 9, the second cover member 716 is configured by a bent plate-shaped member. The second cover member 716 is fixed to the wiring line laying portion 715. In FIG. 9, the up-down direction, the left-right direction and the front-rear direction are defined in a state in which the second cover member 716 is fixed to the wiring line laying portion 715. The second cover member 716 includes a recess portion 716B extending rearward from one end portion 716A and then bent downward in a concave shape, a flat portion 716C extending rearward from the recess portion 716B, a recess portion 716D formed at the rear side of the flat portion 716C, a raised portion 716E formed so as to protrude from the recess portion 716D to a position higher than the flat portion 716C, a flat narrow portion 716F extending rearward from the raised portion 716E, and a slant portion 716G extending obliquely downward from the narrow portion 716F. The narrow portion 716F is disposed in the end portion of the second cover member 716 existing at the side of the first accommodating portion 711. The end portion 716H of the slant portion 716G reaches a position lower than the two recess portions 716B and 716D.

A fixing portion 715B, such as a boss or the like, which has a screw hole, is installed in the wiring line laying portion 715. A hole 717 used in attaching the second cover member 716 to the fixing portion 715B is formed in the second cover member 716. The hole 717 is formed in the recess portion 716B existing at the side of the end portion 716A. As a fastener such as a screw or the like is inserted through the hole 717 and is threadedly coupled to the fixing portion 715B, the second cover member 716 is fixed to the bottom plate 712A of the second accommodating portion 712. When the second cover member 716 is fixed to the wiring line laying portion 715, the end portion 716A is disposed at the front side while the end portion 716H is disposed at the rear side. In the second cover member 716, the portion positioned at the side of the first accommodating portion 711 with respect to the fixing portion 715B (e.g., the recess portion 716D existing at the side of the end portion 716H) is supported from below by support portions 715C installed on the side surface of the partition wall 715A extending forward from the partition wall 713. A projection portion 718 protruding upward is installed in the narrow portion 716F of the second cover member 716. The projection portion 718 is formed in the second cover member 716 such that, when the second cover member 716 is fixed and attached to the fixing portion 715B, the projection portion 718 is disposed at the side of the first accommodating portion 711 with respect to the arrangement position of the end portion 72A of the second frame 72 attached to the first frame 71.

As shown in FIGS. 5 and 10, the second frame 72 is formed into a rectangular shape elongated in the left-right direction in a corresponding relationship with the shape of the first accommodating portion 711. The second frame 72 is attached to the top portion of the first frame 71, thereby covering the top portion of the first accommodating portion 711. In this regard, FIG. 10A is a perspective view showing the surface of the second frame 72 which is to be attached to the first accommodating portion 711. The second frame 72 is fitted and attached from above to the top end portions of the sidewalls 711B, 711C and 711D which define the peripheral edge portion of the opening 711E formed on the top surface of the first accommodating portion 711 of the first frame 71 shown in FIG. 6. When the second frame 72 is attached to the first frame 71, the front end portion 72A of the second frame 72 disposed at the position of the front surface 711F is not fitted to the first frame 71.

The second frame 72 has an opening 72C formed in the portion except the outer peripheral edge 72B thereof. The second frame 72 includes engaging portions 721A to 721C. The engaging portions 721A to 721C are installed in the end portion 72A of the second frame 72.

The engaging portions 721A to 721C protrude downward from the end portion 72A. More specifically, as shown in FIG. 10A, a wall portion 72D erected downward along the left-right direction is installed in the end portion 72A. The engaging portions 721A to 721C are some portions of the wall portion 72D. As shown in FIG. 10B, the protruding height of the engaging portion 721B is lower than the height of the remaining portions of the wall portion 72D. The protruding height of the engaging portions 721A and 721C is equal to the height of the remaining portions of the wall portion 72D.

The contact glass 722 is attached to the outer peripheral edge 72B of the second frame 72. More specifically, the contact glass 722 is bonded to the lower surface of the outer peripheral edge 72B of the second frame 72 by a bonding member such as a double-side tape or the like. As the second frame 72 is attached to the first frame 71, the lower side of the contact glass 722 is supported from below by the top end of the partition wall 713. Thus, the contact glass 722 is vertically sandwiched and fixed by the second frame 72 and the partition wall 713 of the first frame 71 (see FIGS. 12 and 13).

As shown in FIGS. 5 and 11, the first cover member 73 is attached to the top portion of the second accommodating portion 712, thereby covering the top surface of the second accommodating portion 712. The first cover member 73 is fitted and attached from above to the peripheral edge portion of the opening 712D formed on the top surface of the second accommodating portion 712 of the first frame 71 shown in FIG. 6.

The first cover member 73 includes locking portions 731. As shown in FIG. 11B, each of the locking portions 731 are configured by a plate-shaped protrusion piece 731A formed in the end portion 73A of the first cover member 73 existing at the side of the first accommodating portion 711 so as to protrude toward the first accommodating portion 711 and a claw portion 731B protruding upward from the protruding end portion of the protrusion piece 731A. The claw portion 731B is formed in the locking portion 731 such that, when the first cover member 73 is attached to the first frame 71, the claw portion 731B is disposed at the side of the first accommodating portion 711 with respect to the arrangement position of the end portion 72A of the second frame 72 attached to the first frame 71.

Next, the engaging mechanisms 74 (the engaging mechanisms 74A, 74B and 74C) will be described with reference to FIGS. 12 to 14. In the present embodiment, the image forming apparatus 10 includes engaging mechanisms 74A, 74B and 74C as the engaging mechanisms 74. In the following description, the engaging mechanisms 74A, 74B and 74C will be generically referred to as engaging mechanisms 74.

Figure 12A:
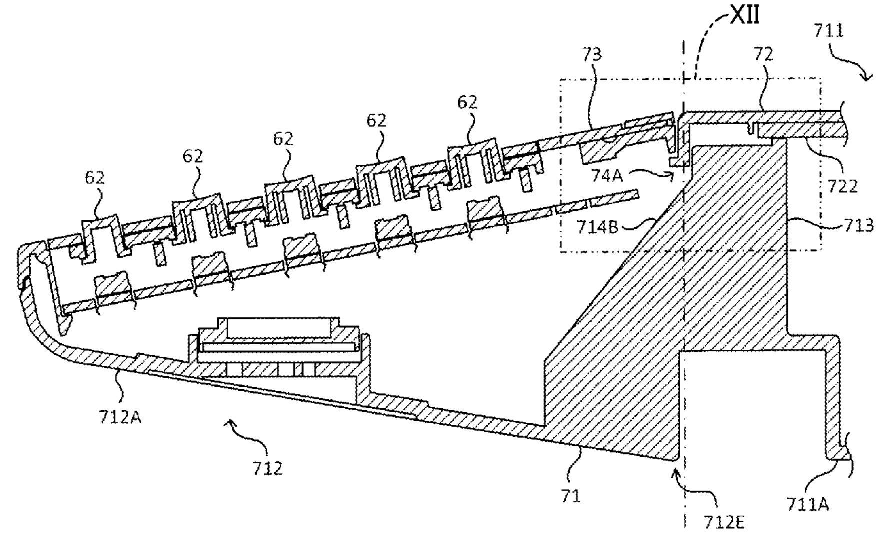
FIG. 12A is a view showing an engaging mechanism of the image forming apparatus according to the present embodiment.
Figure 12B:
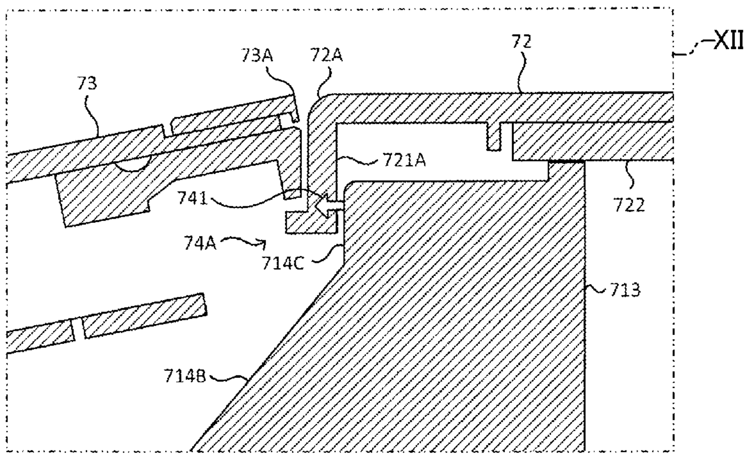
FIG. 12B is an enlarged view of a portion designated by XII in FIG. 12A.
Figure 13A:
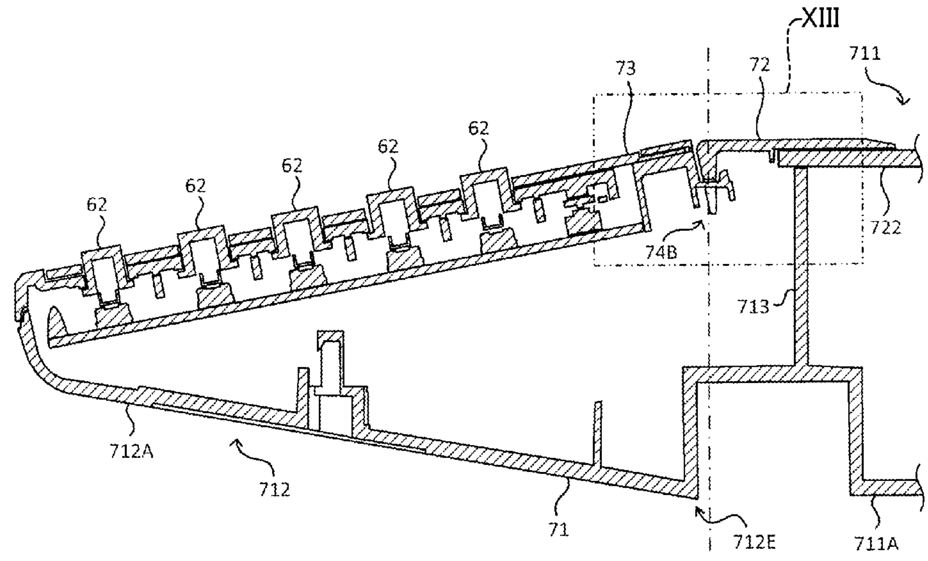
FIG. 13A is a view showing an engaging mechanism of the image forming apparatus according to the present embodiment.
Figure 13B:
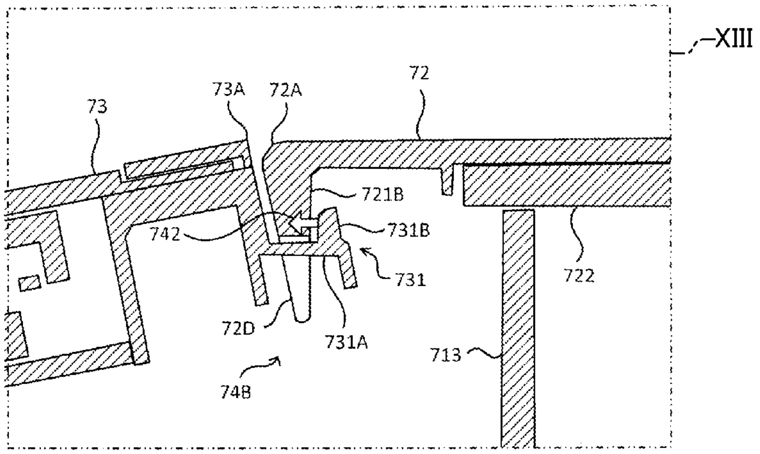
FIG. 13B is an enlarged view of a portion designated by XIII in FIG. 13A.
Figure 14A:
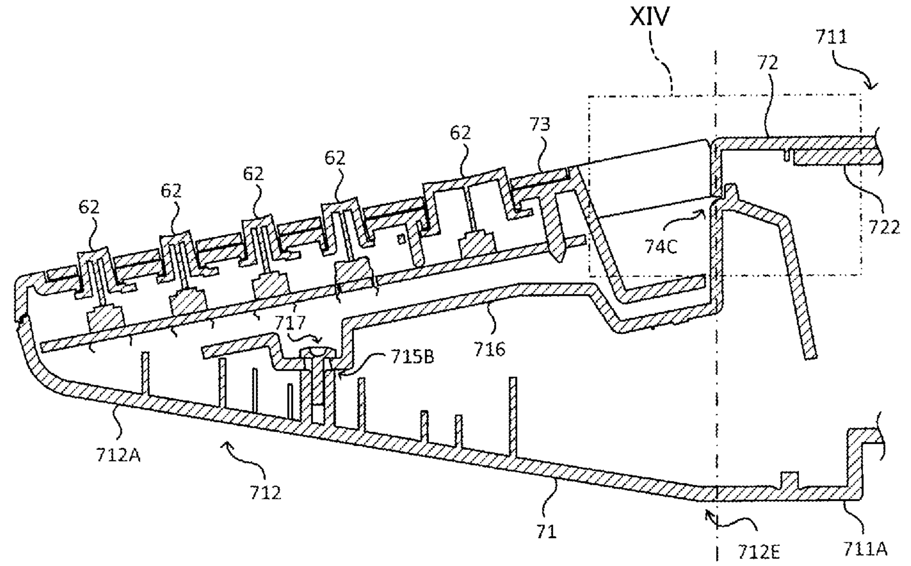
FIG. 14A is a view showing an engaging mechanism of the image forming apparatus according to the present embodiment.
Figure 14B:
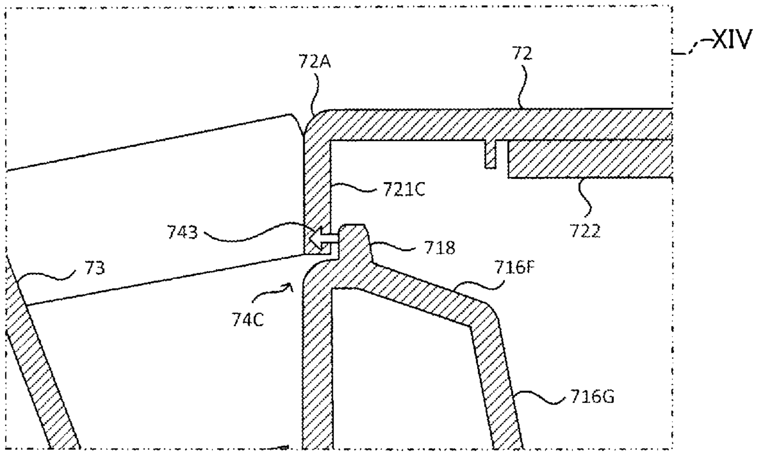
FIG. 14B is an enlarged view of a portion designated by XIV in FIG. 14A.

In this regard, FIG. 12A is a sectional view taken along line D-D in FIGS. 5 and 6. FIG. 12B is an enlarged view of a region surrounded by a double-dot chain line in FIG. 12A. FIG. 13A is a sectional view taken along line E-E in FIGS. 5 and 6. FIG. 13B is an enlarged view of a region surrounded by a double-dot chain line in FIG. 13A. FIG. 14A is a sectional view taken along line F-F in FIGS. 5 and 6. FIG. 14B is an enlarged view of a region surrounded by a double-dot chain line in FIG. 14A. A single-dot chain line shown in FIGS. 12A, 13A and 14A indicates the position of the front surface 711F of the first accommodating portion 711 in the protruding direction of the second accommodating portion 712.

The engaging mechanisms 74 are installed at the side of the base end portion 712E of the second accommodating portion 712 and are configured to bring the second accommodating portion 712 and the second frame 72 into engagement with each in a direction perpendicular to the front surface 711F of the first accommodating portion 711. The engaging mechanism 74A includes the engaging portion 721A and the protrusion portion 714C. The engaging mechanism 74B includes the engaging portion 721B and the claw portion 731B. The engaging mechanism 74C includes the engaging portion 721C and the projection portion 718. In this regard, the protrusion portion 714C, the claw portion 731B and the projection portion 718 are formed to protrude upward at the side of the first accommodating portion 711 with respect to the engaging portions 721A to 721C and are installed so as to make contact with the side surfaces of the engaging portions 721A to 721C existing at the side of the first accommodating portion 711. That is to say, the protrusion portion 714C, the claw portion 731B and the projection portion 718 are one example of engaged portions.

First, description will be made on the engaging mechanism 74A which includes the engaging portion 721A and the protrusion portion 714C. When the second frame 72 is attached to the first frame 71, as shown in FIG. 12B, the protrusion portion 714C is arranged to face, across a small gap, the side surface of the engaging portion 721A existing at the side of the first accommodating portion 711. If the operation unit 62 shown in FIG. 12A is operated by a user and if the second accommodating portion 712 is bent downward about the base end portion 712E, the protrusion portion 714C is moved in the direction indicated by an arrow 741 in FIG. 12B (forward). As the protrusion portion 714C makes contact with the side surface of the engaging portion 721A existing at the side of the first accommodating portion 711, the protrusion portion 714C and the engaging portion 721A engage with each other in the direction perpendicular to the front surface 711F. Thus, the second accommodating portion 712 is supported by the second frame 72 through the engaging portion 721A in the opposite direction to the arrow 741. That is to say, the second accommodating portion 712 is supported such that the second accommodating portion 712 is pulled by the second frame 72 through the engaging portion 721A in the opposite direction to the arrow 741. As a result, the downward bending of the second accommodating portion 712 is suppressed. In the image forming apparatus 10, the engaging mechanism 74 is installed at the side of the base end portion 712E which becomes a bending start point. Therefore, the downward bending of the second accommodating portion 712 is effectively suppressed by the contact of the protrusion portion 714C and the engaging portion 721A. The bending suppression effect is further improved as the position of the engaging mechanism 74 becomes higher than the bending start point. For that reason, it is preferred that the engaging mechanism 74 is installed just below the second frame 72. Alternatively, the protrusion portion 714C and the engaging portion 721A may be disposed so as to make contact with each other with no gap.

Next, description will be made on the engaging mechanism 74B which includes the engaging portion 721B and the claw portion 731B. When the first cover member 73 and the second frame 72 are attached to the first frame 71, as shown in FIG. 13B, the claw portion 731B is arranged to face, across a small gap, the side surface of the engaging portion 721B existing at the side of the first accommodating portion 711. If the operation unit 62 shown in FIG. 13A is operated by a user and if the second accommodating portion 712 is bent downward about the base end portion 712E, the claw portion 731B is moved in the direction indicated by an arrow 742 in FIG. 13B (forward). As the claw portion 731B makes contact with the side surface of the engaging portion 721B existing at the side of the first accommodating portion 711, the claw portion 731B and the engaging portion 721B engage with each other in the direction perpendicular to the front surface 711F. Thus, the second accommodating portion 712 is supported by the second frame 72 through the engaging portion 721B in the opposite direction to the arrow 742. That is to say, the second accommodating portion 712 is supported such that the second accommodating portion 712 is pulled by the second frame 72 through the engaging portion 721B in the opposite direction to the arrow 742. As a result, the downward bending of the second accommodating portion 712 is suppressed just like the case of the protrusion portion 714C. Alternatively, the claw portion 731B and the engaging portion 721B may be disposed so as to make contact with each other with no gap.

In this regard, the engaging portion 721B is formed lower than the remaining portions of the wall portion 72D. As shown in FIG. 13B, the height of the remaining portions of the wall portion 72D is set at such a height that the remaining portions of the wall portion 72D reach a position below the bottom portion of the protrusion piece 731A of the locking portion 731. Thus, the movement of the locking portion 731 in the left-right direction of the image forming apparatus 10 (in the depth direction in FIG. 13B) is restrained by the wall portion 72D positioned at both sides of the engaging portion 721B. When the operation display part 6 is operated, the backlash of the first cover member 73 in the left-right direction is suppressed. In case where, unlike the image forming apparatus 10, the wall portion 72D is not installed in the end portion 72A of the second frame 72, the same effects as mentioned above can be obtained by installing a protrusion portion which protrudes downward deeper than the engaging portion 721B from one side or both sides of the engaging portion 721B. The wall portion 72D positioned at both sides of the engaging portion 721B is one example of a holding portion.

Next, description will be made on the engaging mechanism 74C which includes the engaging portion 721C and the projection portion 718. When the second frame 72 is attached to the first frame 71 with the second cover member 716 fixed to the fixing portion 715B, as shown in FIG. 14B, the projection portion 718 is arranged to face, across a small gap, the side surface of the engaging portion 721C existing at the side of the first accommodating portion 711. If the operation unit 62 shown in FIG. 14A is operated by a user and if the wiring line laying portion 715 is bent downward about the base end portion 712E, the projection portion 718 is moved in the direction indicated by an arrow 743 in FIG. 14B (forward). As the projection portion 718 makes contact with the side surface of the engaging portion 721C existing at the side of the first accommodating portion 711, the projection portion 718 and the engaging portion 721C engage with each other in the direction perpendicular to the front surface 711F. Thus, the second accommodating portion 712 is supported by the second frame 72 through the engaging portion 721C in the opposite direction to the arrow 743. That is to say, the second accommodating portion 712 is supported such that the second accommodating portion 712 is pulled by the second frame 72 through the engaging portion 721C in the opposite direction to the arrow 743. As a result, the downward bending of the second accommodating portion 712 is suppressed just like the case of the protrusion portion 714C and the claw portion 731B. Alternatively, the projection portion 718 and the engaging portion 721C may be disposed so as to make contact with each other with no gap.

As described above, in the image forming apparatus 10, the downward bending of the first frame 71 in the second accommodating portion 712 is suppressed by the engaging mechanisms 74 installed in the housing 7. For that reason, in the image forming apparatus 10, the image reading part 2 and the operation display part 6 can be accommodated within one housing 7 without impairing the operation feeling of the operation display part 6.

In the image forming apparatus 10, the engaging portions 721A to 721C, the protrusion portion 714C, the claw portion 731B and the projection portion 718, all of which constitute the engaging mechanisms 74, are formed into a simple shape. This makes it possible to realize the engaging mechanisms 74 with a simple configuration.

In the image forming apparatus 10, the second frame 72 is bonded to the contact glass 722. Thus, the stiffness of the second frame 72 having the engaging portions 721A to 721C is reinforced by the contact glass 722, whereby the bending of the second accommodating portion 712 is effectively suppressed.

Unlike the image forming apparatus 10, it may be possible to employ a configuration which includes one or more of the engaging mechanisms 74A, 74B and 74C. It may also be possible to a plurality of engaging mechanisms 74 having the same combination of an engaging portion and an engaged portion. In either case, the effect of suppressing the bending of the second accommodating portion 712 is enhanced as the number of the engaging mechanisms 74 of the image forming apparatus 10 grows larger.

What is claimed is:

1. An image forming apparatus, comprising:

an image reading part configured to read an image of a manuscript placed on a manuscript placing surface;

an operation unit configured to receive an input operation; and a housing configured to accommodate the image reading part and the operation unit, wherein the housing includes:

a first frame which includes a first accommodating portion having a bottom plate to be supported on a predetermined support surface, the first accommodating portion having an accommodating space for accommodating the image reading part, and a second accommodating portion protruding outward in a first direction from a side surface of the first accommodating portion, the second accommodating portion positioned higher than the bottom plate, the second accommodating portion having an accommodating space for accommodating the operation unit;

a second frame attached to a peripheral edge portion of an opening formed on a top surface of the first accommodating portion; and an engaging mechanism installed at the side of a base end portion of the second accommodating portion and configured to bring the second accommodating portion and the second frame into engagement with each other in a direction perpendicular to the side surface of the first accommodating portion.

2. The apparatus of claim 1, wherein the engaging mechanism includes:

engaging portions protruding downward from an end portion of the second frame existing at the side of the second accommodating portion; and engaged portions protruding upward at the side of the first accommodating portion with respect to the engaging portions, the engaged portions being capable of making contact with side surfaces of the engaging portions existing at the side of the first accommodating portion.

3. The apparatus of claim 2, wherein a partition wall is installed between the first accommodating portion and the second accommodating portion, plate-shaped ribs perpendicular to the partition wall and a bottom surface of the second accommodating portion are installed in the second accommodating portion to extend from the partition wall in the first direction, and the engaged portions are installed in the ribs.

4. The apparatus of claim 2, further comprising:

a first cover member configured to cover a top surface of the second accommodating portion and attached to the second accommodating portion, wherein the first cover member includes a locking portion which includes a protrusion piece protruding from an end portion existing at the side of the first accommodating portion toward the first accommodating portion and a claw portion protruding upward from a protruding end portion of the protrusion piece, the engaged portions including the claw portion of the locking portion.

5. The apparatus of claim 4, wherein the second frame includes a holding portion protruding downward from one side or both sides of each of the engaging portions in an end portion of the second frame existing at the side of the second accommodating portion, the holding portion including a tip portion which reaches a position existing below a bottom portion of the protrusion piece of the locking portion.

6. The apparatus of claim 2, further comprising:

a second cover member fixed at one end to a fixing portion of a bottom portion of the second accommodating portion, the second cover member extending from the fixing portion toward the first accommodating portion, the second cover member configured to cover a wiring line laid in the bottom portion of the second accommodating portion, wherein the engaged portions include a projection portion protruding upward from an end portion of the second cover member existing at the side of the first accommodating portion.

7. The apparatus of claim 1, further comprising:

a contact glass having a manuscript placing surface, the contact glass bonded to an outer peripheral edge of the second frame.

* * * * *